United States Patent
Patrick et al.

(10) Patent No.: US 10,861,230 B2
(45) Date of Patent: Dec. 8, 2020

(54) SYSTEM-GENERATED STABLE BARYCENTRIC COORDINATES AND DIRECT PLANE EQUATION ACCESS

(71) Applicant: NVIDIA Corporation, Santa Clara, CA (US)

(72) Inventors: David Patrick, Madison, AL (US); Dale L. Kirkland, Madison, AL (US); Henry Packard Moreton, Woodside, CA (US); Ziyad Sami Hakura, San Jose, CA (US); Yury Uralsky, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 42 days.

(21) Appl. No.: 16/268,915

(22) Filed: Feb. 6, 2019

(65) Prior Publication Data

US 2020/0043228 A1 Feb. 6, 2020

Related U.S. Application Data

(60) Provisional application No. 62/713,442, filed on Aug. 1, 2018.

(51) Int. Cl.
*G06T 17/10* (2006.01)
*G06T 1/20* (2006.01)
(Continued)

(52) U.S. Cl.
CPC ........... *G06T 17/10* (2013.01); *G06F 9/3877* (2013.01); *G06T 1/20* (2013.01); *G06T 15/005* (2013.01)

(58) Field of Classification Search
None
See application file for complete search history.

(56) References Cited

U.S. PATENT DOCUMENTS 6,532,013 B1 * 3/2003 Papakipos ............... G06T 15/50
345/426
6,597,363 B1 * 7/2003 Duluk, Jr. ............ G06T 15/005
345/506

(Continued)

OTHER PUBLICATIONS

Goransson, "A Temporal Stable Distance to Edge Anti-Aliasing Technique for GCN Architecture," thesis No. MECS-2015-05 from Blekinge Tekniska Hogskola, 2015, 54 pages.

(Continued)

*Primary Examiner* — James A Thompson
(74) *Attorney, Agent, or Firm* — Leydig, Voit & Mayer, Ltd.

(57) ABSTRACT

A graphics processing pipeline includes three architectural features that allow a fragment shader to efficiently calculate per-sample attribute values using barycentric coordinates and per-vertex attributes. The first feature is barycentric coordinate injection to provide barycentric coordinates to the fragment shader. The second feature is an attribute qualifier that allows an attribute of a graphics primitive to be processed without conventional fixed-function interpolation. The third feature is a direct access path from the fragment shader to triangle data storage hardware resources where vertex attribute data and/or plane equation coefficients are stored. Allowing the fragment shader to calculate per-sample attribute values in this way advantageously increases system flexibility while reducing workload associated with triangle plane equation setup.

20 Claims, 13 Drawing Sheets

(51) Int. Cl.
*G06T 15/00* (2011.01)
*G06F 9/38* (2018.01)

(56) References Cited

U.S. PATENT DOCUMENTS

| | | | |
|---|---|---|---|
| 9,747,718 B2* | 8/2017 | Patney | G06T 15/80 |
| 10,204,440 B2* | 2/2019 | Heggelund | G06T 15/80 |
| 2008/0024490 A1* | 1/2008 | Loop | G06T 15/40 |
| | | | 345/421 |
| 2014/0267276 A1* | 9/2014 | Hakura | G06T 15/005 |
| | | | 345/426 |
| 2015/0228111 A1* | 8/2015 | Kim | G06T 7/50 |
| | | | 345/427 |
| 2016/0049000 A1* | 2/2016 | Patney | G06T 1/20 |
| | | | 345/426 |
| 2017/0039755 A1* | 2/2017 | Heggelund | G06T 15/80 |
| 2018/0197268 A1* | 7/2018 | Grantham | G06T 15/005 |
| 2018/0300915 A1* | 10/2018 | Heggelund | G06T 1/20 |
| 2018/0300944 A1* | 10/2018 | Surti | G06T 17/205 |

OTHER PUBLICATIONS

Persson, "Filtering Approaches for Real-Time Anti-Aliasing: Geometry Buffer Anti-Aliasing (GBAA)," SigGraph Vancouver, 2011, 19 pages.

Stachowiak, "A deferred material rendering system," online article, Dec. 18, 2015, 52 pages. Retrieved from https://onedrive.live.com/view.aspx?resid=EBE7DEDA70D06DA0!115&app=PowerPoint&authkey=!AP-pDh4IMUug6vs.

Haar et al., "GPU-Driven Rendering Pipelines," SIGGRAPH 2015, 60 pages. Retrieved from http://advances.realtimerendering.com/s2015/aaltonenhaar_siggraph2015_combined_final_footer_220dpi.pptx.

* cited by examiner

SYSTEM-GENERATED STABLE BARYCENTRIC COORDINATES AND DIRECT PLANE EQUATION ACCESS

CLAIM OF PRIORITY

This application claims the benefit of U.S. Provisional Application No. 62/713,442 titled "System-Generated Stable Barycentric Coordinates and Direct Plane Equation Access," filed Aug. 1, 2018, the entire contents of which is incorporated herein by reference.

TECHNICAL FIELD

The present disclosure relates to graphics rendering, and more particularly to system-generated stable barycentric coordinates and direct plane equation access.

BACKGROUND

Attribute interpolation in conventional graphics rendering systems is performed by setting up a different plane equation for each different attribute and evaluating the different plane equations in fixed-function interpolation circuits to provide interpolated per-sample attribute values to a fragment shader. However, setting up the different plane equations can be computationally expensive and grows yet more expensive as the number of different attributes increases. Furthermore, evaluating the plane equations in fixed-function interpolation circuits can limit overall system flexibility by limiting attribute data types to specifically supported data types. Thus, there is a need for addressing these issues and/or other issues associated with the prior art.

SUMMARY

A graphics processing pipeline includes three architectural features that allow a fragment shader to efficiently calculate per-sample attribute values using barycentric coordinates and per-vertex attributes. The first feature is barycentric coordinate injection to provide barycentric coordinates to the fragment shader. The second feature is an attribute qualifier that allows an attribute of a graphics primitive to be processed without conventional fixed-function interpolation. The third feature is a direct access path from the fragment shader to triangle data storage hardware resources where vertex attribute data and/or plane equation coefficients are stored. Allowing the fragment shader to calculate per-sample attribute values in this way advantageously increases system flexibility while reducing workload associated with triangle plane equation setup.

A method, computer readable medium, and system are disclosed for generating interpolated per-sample attribute values within a fragment shader, based on per-vertex attributes and barycentric coordinates provided to the fragment shader. The method comprises receiving per-primitive attribute data by the fragment shader and determining an attribute data format associated with the per-primitive attribute data. The method further comprises evaluating, by the fragment shader, a plane equation defining a primitive to compute per-sample attribute values when the attribute data format indicates the per-primitive attribute data comprises plane equation coefficients, or evaluating, by the fragment shader, a barycentric-based equation defining the primitive to compute the per-sample attribute values when the attribute data format indicates the per-primitive attribute data comprises per-vertex attributes and plane equation coefficients for barycentric weights.

The computer readable medium includes instructions that, when executed by a parallel processor system, cause the parallel processor system to perform the method. Furthermore, the system includes a parallel processor configured to perform the method.

DETAILED DESCRIPTION

Embodiments of the present disclosure allow a fragment shader within a graphics processing pipeline to calculate interpolated per-sample attribute values. In an embodiment, the fragment shader may operate in a plane equation mode to calculate per-sample attribute values by evaluating an attribute plane equation using plane equation coefficients referred herein to as A, B, and C coefficients. In an embodiment, the fragment shader may also operate in a barycentric mode to calculate per-sample attribute values based on barycentric coordinates (weights) and per-vertex attributes. Furthermore, the fragment shader may calculate the barycentric coordinates by evaluating a barycentric plane equation. An attribute data format may be advantageously defined programmatically within the fragment shader and not limited to predefined attribute types explicitly supported by interpolation circuits. In an embodiment, the fragment shader comprises a pixel shader, and/or the graphics processing pipeline comprises a graphics rendering pipeline.

In an embodiment, to support the plane equation mode and the barycentric mode, three specific architectural features are provided by the graphics processing pipeline. The first feature is barycentric coordinate injection into the graphics processing pipeline. In an embodiment, the barycentric plane equation is set up (e.g. in a triangle setup pipeline stage) and barycentric plane equation coefficients are transmitted to the fragment shader, which evaluates the barycentric plane equation to calculate per-sample barycentric coordinates. The second feature is an attribute qualifier that allows an attribute of a graphics primitive to be processed without fixed-function interpolation, allowing the fragment shader to perform interpolation operations for the attribute. Furthermore, each different attribute of a graphics primitive (e.g., a triangle) may be independently assigned a processing mode, including the plane equation mode, the barycentric mode, and different modes where fixed-function hardware provides interpolated per-sample attribute values (e.g., conventional modes). The third feature is a direct access path from the fragment shader to triangle data storage hardware resources (i.e., triangle random-access memory or TRAM), where vertex attribute data and/or plane equation coefficients are stored.

Figure 1A:
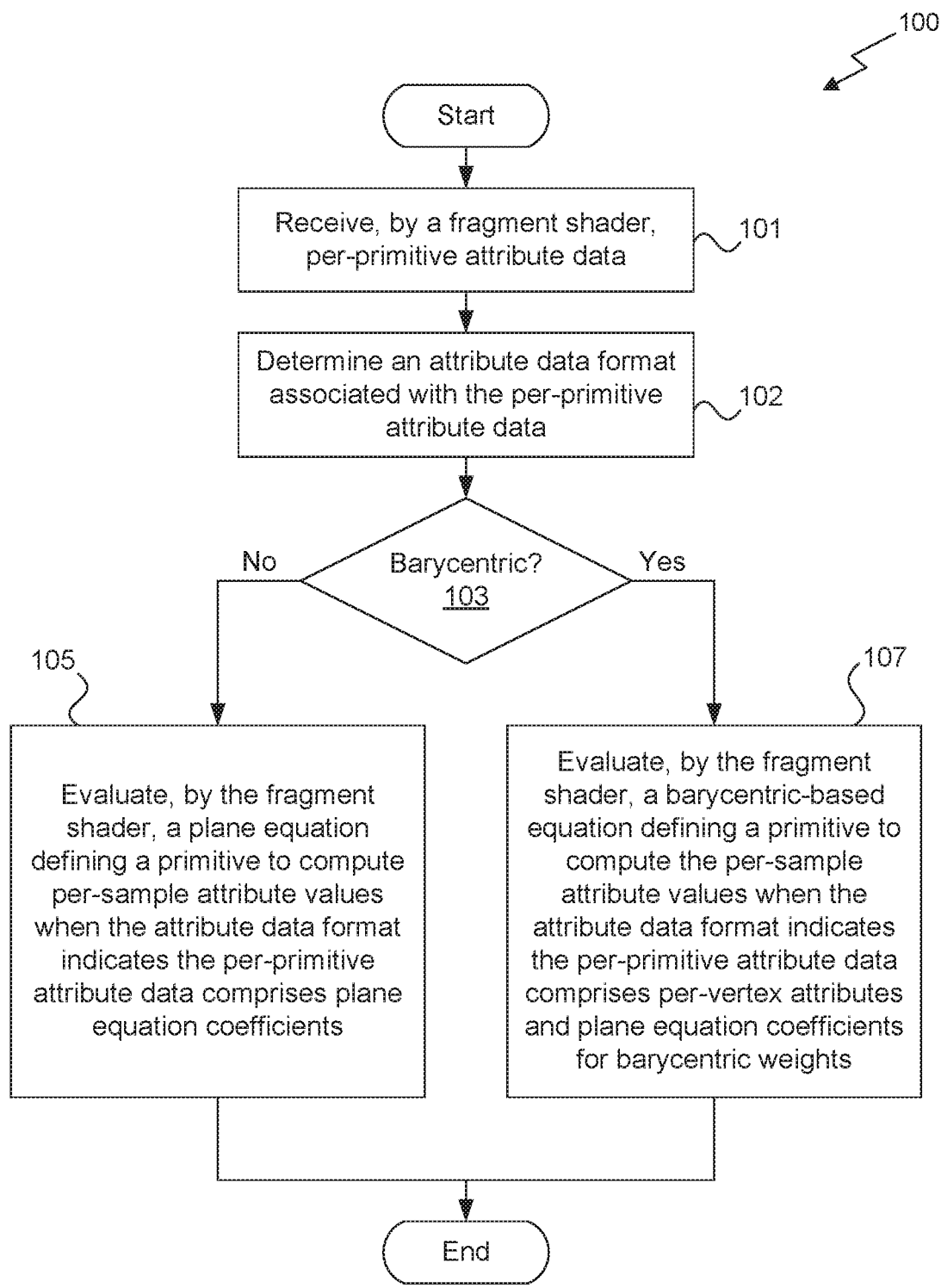
FIG. 1A illustrates a flowchart of a method for computing per-sample attributes, in accordance with an embodiment.

FIG. 1A illustrates a flowchart of a method 100 for computing per-sample attributes, in accordance with an embodiment. Although method 100 is described in the context of a multiprocessor system, the method 100 may also be performed by any technically feasible processing system, any custom circuitry, or by a combination of custom circuitry and program instructions. The method 100 may be executed by circuitry within a GPU, a GPU cluster, circuitry within a CPU cluster, or any other technically feasible multiprocessor system, such as parallel processing unit (PPU) 300 of FIG. 3 and/or graphics processing pipeline 200 of FIG. 2A. In an embodiment PPU 300 is configured to implement graphics processing pipeline 200. Furthermore, persons of ordinary skill in the art will understand that any system that performs method 100 is within the scope and spirit of various embodiments. In an embodiment, method 100 is performed by a multiprocessor system comprising a GPU device.

At step 101, a fragment shader (e.g., one of fragment shaders 214) within the graphics processing pipeline 200 receives per-primitive attribute data. The per-primitive attribute data may include an attribute qualifier, which indicates whether an attribute for a primitive should be rendered using the attribute plane equation mode or the barycentric mode. Note that other interpolation modes (e.g., conventional fixed-function interpolation) may be processed according to different techniques (not shown).

At step 102, the graphics processing pipeline 200 determines an attribute data format associated with the per-primitive attribute data based on the attribute qualifier. If, at step 103, the attribute data format is a barycentric data format, then per-sample attribute values will be calculated in the barycentric mode and the method proceeds to step 107. At step 107, the fragment shader evaluates a barycentric-based equation defining the primitive to compute the per-sample attribute values when the attribute data format indicates the per-primitive attribute data comprises per-vertex attributes and plane equation coefficients for barycentric weights. Any technically feasible barycentric-based equation may be used and any technically feasible technique may be performed to evaluate the barycentric-based equation without departing the scope and spirit of various embodiments. For example, the barycentric plane equation may be used to calculate barycentric coordinates, and a per-sample attribute value computed by performing a dot product between the barycentric coordinates and a vector formed by per-vertex attributes. The method then terminates.

Returning to step 103, if the attribute data format is not a barycentric data format, then per-sample attribute values should be calculated in the attribute plane equation mode and the method proceeds to step 105. At step 105, the graphics processing pipeline evaluates, by the fragment shader, a plane equation defining the primitive to compute per-sample attribute values when the attribute data format indicates the per-primitive attribute data comprises plane equation coefficients. The method then terminates.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
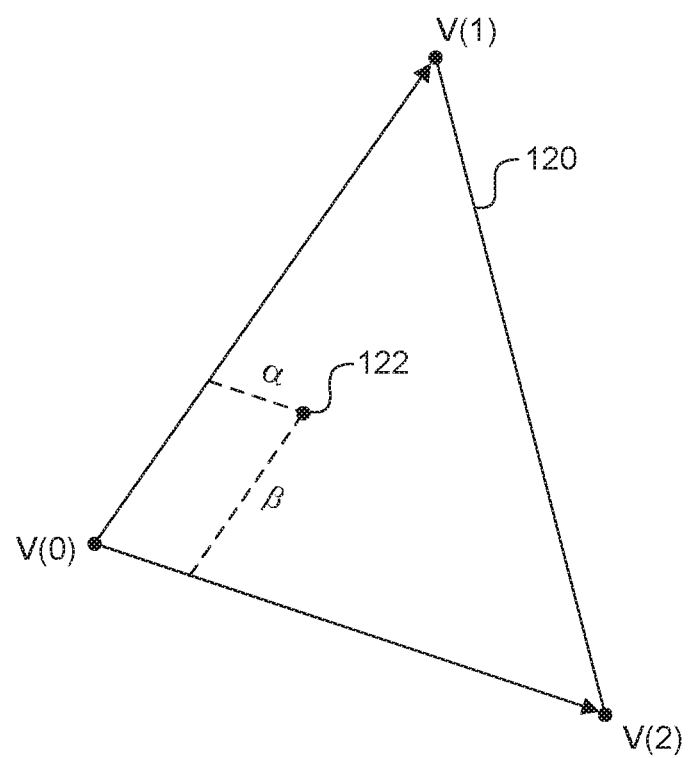
FIG. 1B illustrates a barycentric coordinate within the plane of a triangle, in accordance with an embodiment.

FIG. 1B illustrates a barycentric coordinate 122 within the plane of a triangle 120, in accordance with an embodiment. The barycentric coordinate 122 is located within the triangle 120 using barycentric coordinates alpha ($\alpha$), beta ($\beta$), and optionally gamma ($\gamma$, not shown). One defining constraint of a barycentric coordinate is that the sum of $\alpha+\beta+\gamma$ is equal to one (1); consequently, one barycentric coordinate may be calculated from the other two. The triangle 120 includes three vertices V(0), V(1), and V(2) that define the plane of the triangle 120. Each vertex V(0), V(1), V(2) may include a per-vertex attribute value (or values) for a given attribute. A vertex attribute may include, without limitation, a texture map coordinate, a color value, an intensity value, a normal vector, a depth value, and so forth.

An attribute plane equation may be described in a given space, such as a screen space, using three coefficients A, B, and C. In the plane equation mode, the fragment shader may calculate a per-sample attribute value at a screen space location (x,y) by evaluating the attribute plane equation as Ax+By+C. In the barycentric mode, the fragment shader may evaluate a barycentric plane equation to calculate barycentric coordinate 122. The fragment shader may then calculate a per-sample attribute value by performing a dot product operation between the barycentric coordinate 122 and a vector comprising corresponding per-vertex attributes.

Figure 1C:
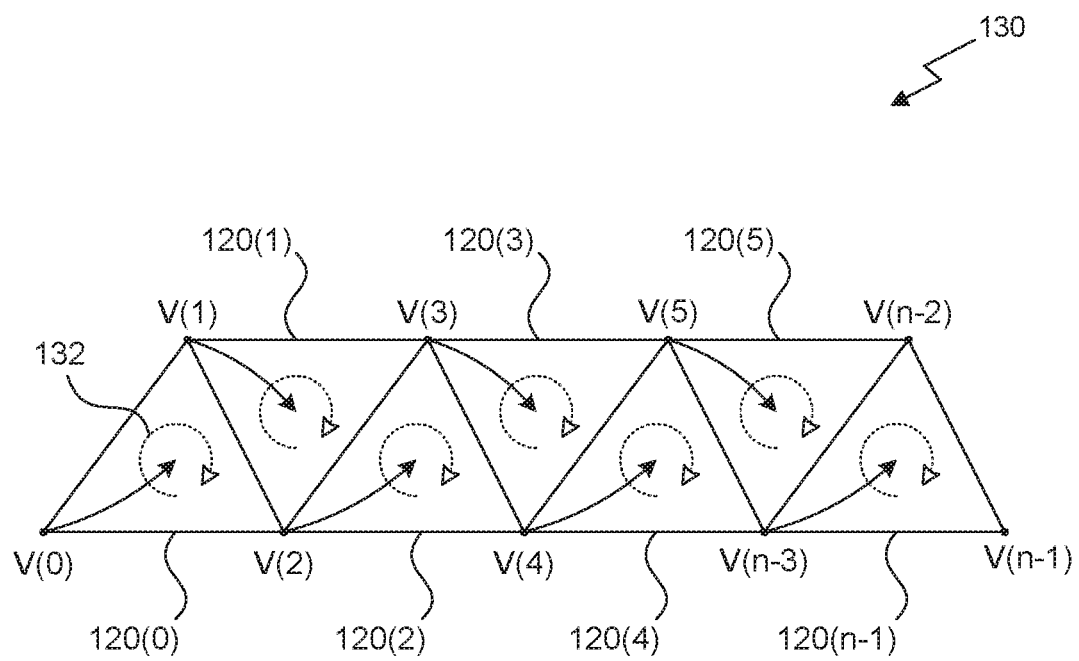
FIG. 1C illustrates vertex ordering in a triangle strip, in accordance with an embodiment.

FIG. 1C illustrates vertex ordering in a triangle strip 130, in accordance with an embodiment. As shown, the triangle strip 130 includes triangles 120 and vertices V. For example, triangle 120(0) includes vertices V(0), V(1), V(2), with a provoking vertex (e.g., first vertex) V(0). Triangle 120(1) includes vertices V(1), V(3), and V(2), with provoking vertex V(1).

In an embodiment, the triangle strip 130 may be specified using conventional application programming interface (API) vertex ordering, shown as vertices V(0), V(1), V(2), V(3), V(4), and so forth. However, this vertex order and triangle strip construction causes a winding direction 132 of sequential triangles (e.g., triangles 120(0), 120(1), 120(2), and so forth) to alternate. To maintain consistent winding direction 132 (e.g., clockwise, as shown) for sequential triangles, vertex order for every other triangle in the triangle strip 130 may be flipped for presentation to the fragment shader. More generally, triangles in even sequential positions within the triangle strip 130 may be presented to the fragment shader with an unchanged vertex order, while triangles in odd sequential positions within the triangle strip 130 may be presented to the fragment shader with a flipped vertex order.

Any technically feasible technique may be performed to flip vertex order for every other triangle to maintain consistent winding direction 132. For example, in an embodiment, a second instance of per-vertex data is generated and transmitted to the fragment shader, with per-vertex ordering appropriately flipped. Furthermore, sequential vertices (e.g., vertices V(0), V(1), V(2), etc.) in the triangle strip 130 may be designated as a provoking vertex for corresponding sequential triangles 120.

In an embodiment, vertex data for triangle 120(0) may be presented to the fragment shader using vertex order V(0), V(1), V(2), with vertex V(0) designated as the provoking vertex. Additionally, vertex data for triangle 120(1) may be flipped and presented to the fragment shader using vertex order V(1), V(3), V(2) (to preserve the clockwise winding direction 132), with vertex V(1) designated as the provoking vertex for triangle 120(1). By flipping vertices for every other triangle 120 relative to API vertex order, winding direction 132 may be maintained within sequential triangles 120 of the triangle strip 130.

In an embodiment, vertex data for individually specified primitives (not within a strip or mesh) is presented to the fragment shader in the same order as originally presented to an API stream for the primitive. For example, if triangle 120(0) is presented to the API using vertices ordered as V(0), V(1), and V(2), then the fragment shader will be presented with the vertices in the same order of V(0) V(1) and V(2). Various implementation-dependent reordering operations on vertices may occur within the graphics processing pipeline. In certain embodiments, a copy of vertex data and/or other primitive data, as presented to the API, is stored within memory circuits (e.g., TRAM 216 of FIG. 2A) and provided to the fragment shader to guarantee consistent vertex ordering.

Figure 1D:
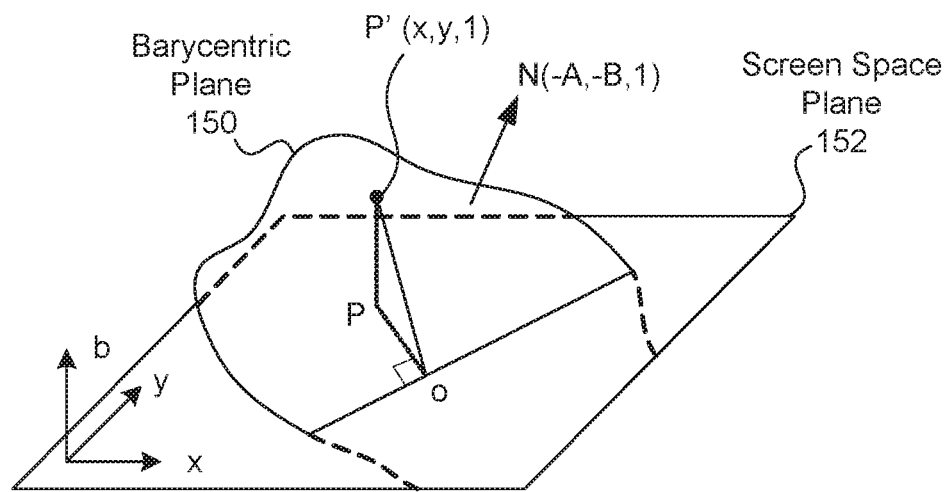
FIG. 1D illustrates a barycentric plane with respect to a screen space plane, in accordance with an embodiment.

FIG. 1D illustrates a barycentric plane 150 with respect to a screen space plane 152, in accordance with an embodiment. As shown, x and y axes define a coordinate space within the screen space plane 152, and point P may be located within the coordinate space. Furthermore, different points along the barycentric plane 150 may have a height along an orthogonal axis b relative to the x and y axes. In particular, a point P may be located on the screen space plane 152, and a plane equation for the barycentric plane 150 may be evaluated at point P to locate point P' on the barycentric plane 150.

Figure 1E:
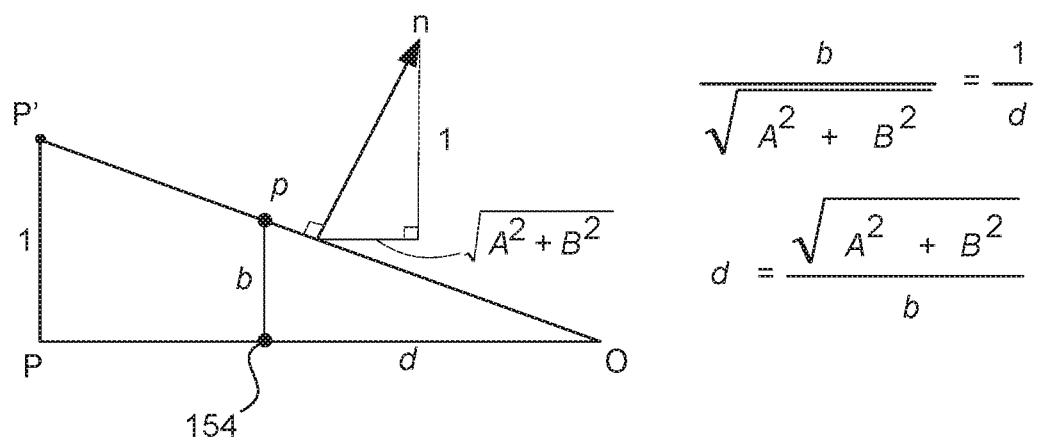
FIG. 1E illustrates a technique for calculating a distance between a point located within a triangle and the nearest edge of the triangle, in accordance with an embodiment.

FIG. 1E illustrates a technique for calculating a distance between a point 154 located within a triangle primitive and the nearest edge of the triangle primitive (at O), in accordance with an embodiment. As shown, a distance d between the point 154 and O may be calculated as a square root of a sum of squares of Barycentric plane equation coefficients A and B, divided by a value b resulting from evaluating the barycentric plane equation at the point 154.

Figure 2A:
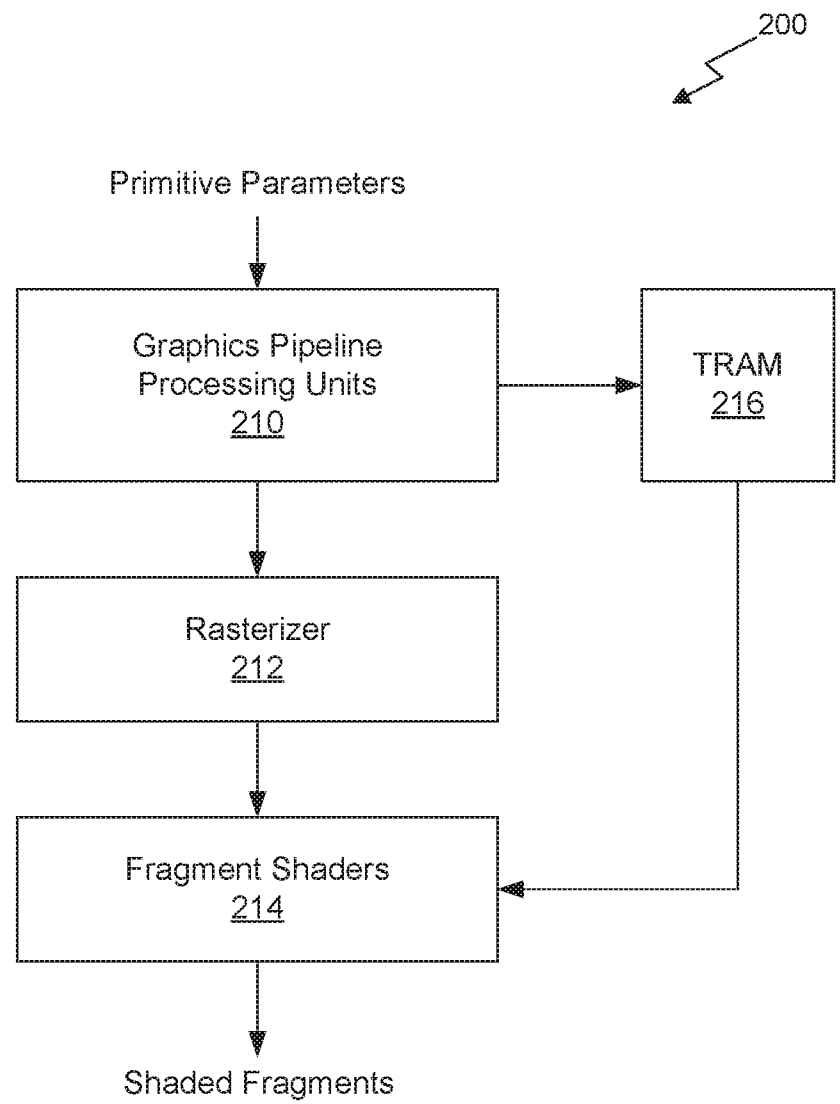
FIG. 2A illustrates a block diagram of a graphics processing pipeline, in accordance with an embodiment.

FIG. 2A illustrates a block diagram of a graphics processing pipeline 200, in accordance with an embodiment. As shown, the graphics processing pipeline 200 includes graphics pipeline processing units 210, a rasterizer 212, fragment shaders 214, and TRAM 216. In an embodiment, per-vertex attribute data is computed by the graphics pipeline processing units 210. Furthermore, plane equation coefficients may be calculated by the graphics pipeline processing units 210. The plane equation coefficients and per-vertex attribute data are stored in TRAM 216. In an embodiment, memory access circuits are configured to provide the fragment shaders 214 with direct access to the plane equation coefficients and per-vertex attribute data stored within the TRAM 216. In an embodiment, the graphics processing pipeline 200 is implemented within one or more general processing clusters (GPCs) 350 of FIG. 3, and at least one programmable streaming multiprocessor (SM) 440 of FIG. 4A is configured to perform as one or more fragment shaders 214.

In the plane equation mode, plane equation coefficients (A, B, and C) for a given attribute may be calculated by a triangle setup unit within the graphics pipeline processing units 210. The fragment shaders 214 then calculate per-sample attribute values by accessing the plane equation coefficients within TRAM 216 and evaluating the corresponding plane equation of a given type of attribute. In barycentric mode, plane equation coefficients for a barycentric plane equation are calculated by the triangle setup unit and stored within TRAM 216. Various per-vertex attributes may also be stored within the TRAM 216. The fragment shaders 214 calculate barycentric coordinates by evaluating a barycentric plane equation using the barycentric plane equation coefficients stored in the TRAM 216. The fragment shaders 214 then calculate a per-sample attribute value based on the barycentric coordinates and the per-vertex attributes stored in the TRAM 216.

The per-vertex attributes may be represented in a fixed-point format or floating-point format that may include any number of total bits (e.g., 8, 16, 24, 32, etc.). Furthermore, the per-vertex attributes may be packed into words for storage within the TRAM 216. For example, two 16-bit values may be packed into a 32-bit word.

In an embodiment, the rasterizer 212 rasterizes a given graphics primitive to produce fragment data that is provided to the fragment shaders 214 as input. The fragment data may include screen space coordinates for a screen space region covered by the graphics primitive and assigned to a given fragment shader for processing and/or rendering. In an embodiment, the screen space coordinates may be used as input coordinates for evaluating a given plane equation, such as the barycentric plane equation, an attribute plane equation, or any other technically feasible plane equation. Data stored in the TRAM 216 and accessed by the fragment shaders 214 may advantageously bypass certain graphics pipeline units (e.g., rasterizer 212) because the fragment shaders 214 may read the per-primitive attribute data and per-vertex attribute data directly from the TRAM 216.

Note that different fragment shaders 214 operating on the same graphics primitive may use the same barycentric plane equation to compute different barycentric coordinates (e.g., based on different screen space coordinates) and different per-sample attribute values for various attributes. The fragment shaders 214 may also calculate and/or modify barycentric weights, such as with a higher-order function. Additionally, the fragment shaders 214 may access the barycentric plane equation coefficients from TRAM 216 to perform additional operations such as computing a distance to a corresponding edge of the primitive.

In an embodiment, a graphics primitive for a line is rendered by setting one of the barycentric weights to zero. The other two barycentric weights may locate a point on the line, and the sum of the barycentric weights (coordinates) may remain equal to one for all rendered samples on the line. In one example, fragment shaders 214 may shade pixels comprising a line with the same one barycentric weight set to zero at each pixel. An exemplary usage case is in rendering wireframe models, where line primitives are rendered along triangle edges. In another embodiment, a graphics primitive for a point is similarly rendered by setting two barycentric weights to zero.

Figure 2B:
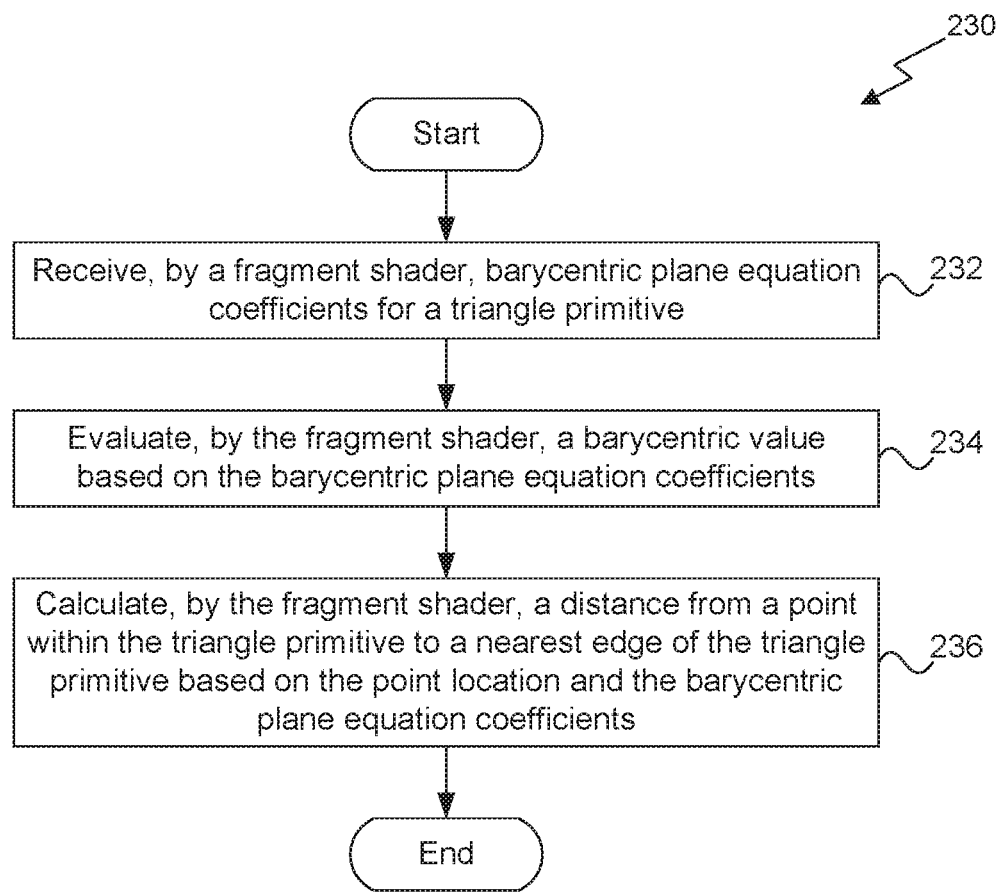
FIG. 2B illustrates a flowchart of a method for calculating a distance between a point located within a triangle and the nearest edge of the triangle, in accordance with an embodiment.

FIG. 2B illustrates a flowchart of a method 230 for calculating a distance between a point located within a triangle and the nearest edge of the triangle, in accordance with an embodiment. Although method 230 is described in the context of a multiprocessor system, the method 230 may also be performed by any technically feasible processing system, any custom circuitry, or by a combination of custom circuitry and program instructions. The method 230 may be executed by circuitry within a GPU, a GPU cluster, circuitry within a CPU cluster, or any other technically feasible multiprocessor system, such as parallel processing unit (PPU) 300 of FIG. 3 and/or graphics processing pipeline 200 of FIG. 2A. In an embodiment PPU 300 is configured to implement graphics processing pipeline 200. Furthermore, persons of ordinary skill in the art will understand that any system that performs method 230 is within the scope and spirit of various embodiments. In various embodiments, method 230 is performed by a multiprocessor system comprising a GPU device. In an embodiment, method 230 is performed by a fragment shader 214.

At step 232, the fragment shader receives barycentric plane equation coefficients (e.g., A, B, and C coefficients) for a triangle primitive. In an embodiment, the fragment shader is configured to directly read the barycentric plane equation coefficients from TRAM 216. At step 234, the fragment shader evaluates a barycentric value (e.g., element b in FIG. 1E) based on the barycentric plane equation coefficients. In an embodiment, the fragment shader executes programming instructions to evaluate the barycentric value. At step 236, the fragment shader calculates a distance from a point within the triangle primitive to a nearest edge of the triangle primitive based on the point location and the barycentric plane equation coefficients. In an embodiment, the distance is equal to a square root of a sum of barycentric plane equation coefficients divided by the barycentric value, as shown in FIG. 1E. After calculating the distance, the method 230 terminates.

A method, computer readable medium, and system are disclosed for calculating interpolated per-sample attribute values. When operating in the disclosed barycentric mode, fragment shaders 214 can calculate barycentric coordinates from barycentric plane equation coefficients provided through the TRAM 216 and use the barycentric coordinates to generate per-sample attribute values. When operating in the disclosed plane equation mode, fragment shaders 214 can generate per-sample attribute values by evaluating an attribute plane equation from plane equation coefficients provided through the TRAM 216. The disclosed techniques advantageously provide increased flexibility within fragment shaders 214 while reducing overall workload associated with triangle setup in a graphics pipeline, such as graphics processing pipeline 200.

Parallel Processing Architecture

Figure 3:
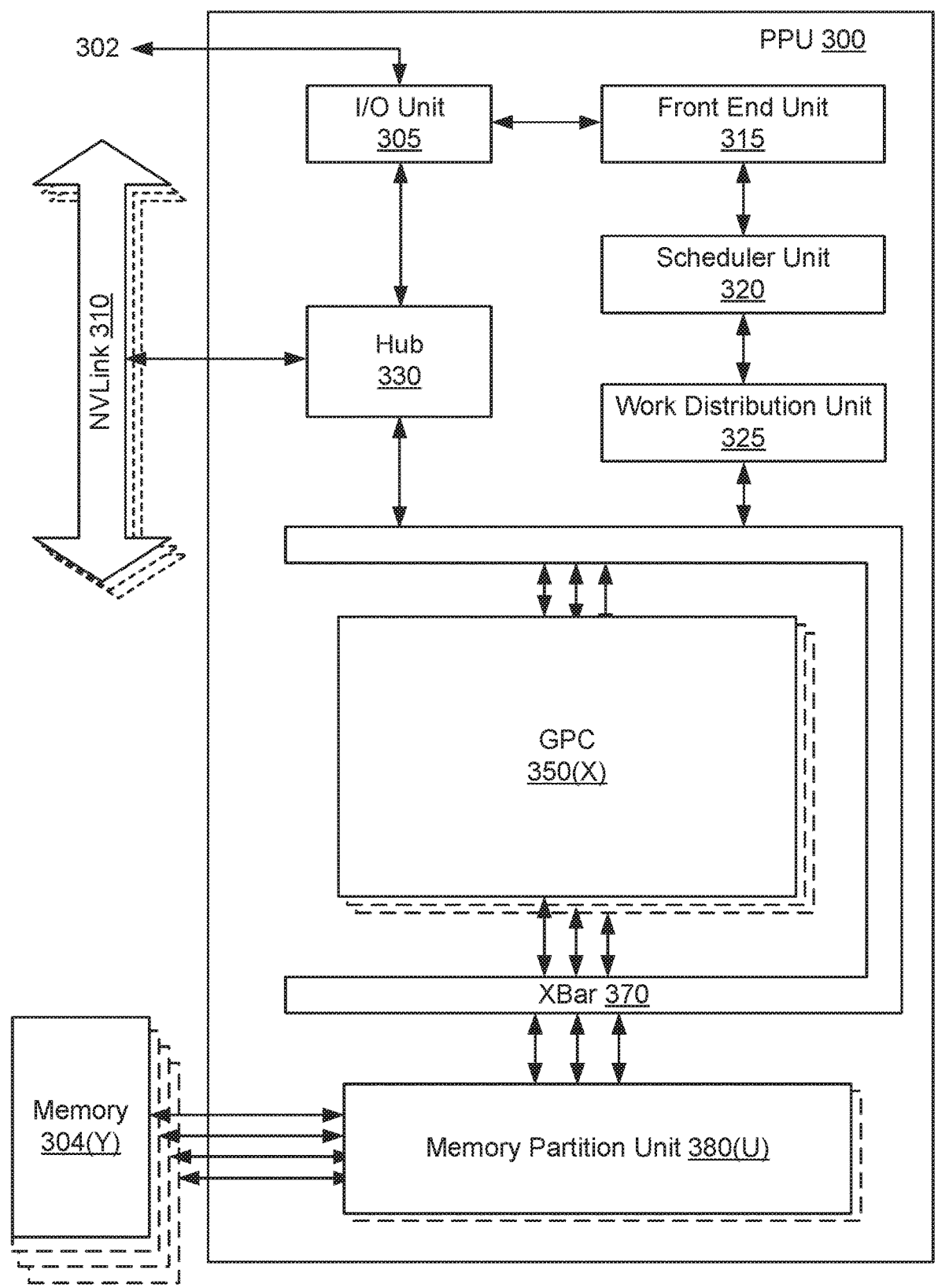
FIG. 3 illustrates a parallel processing unit, in accordance with an embodiment.
Figure 4A:
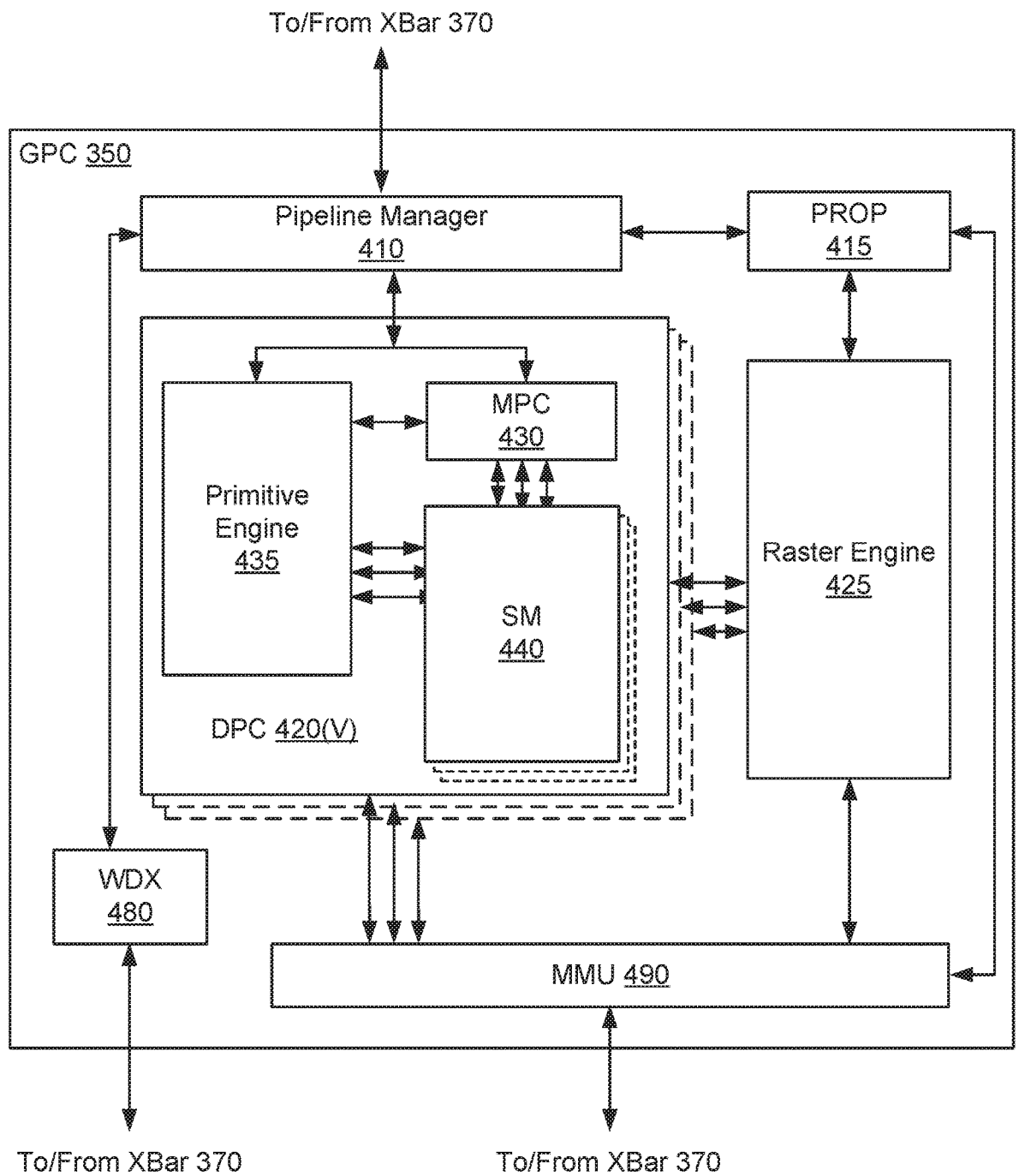
FIG. 4A illustrates a general processing cluster within the parallel processing unit of FIG. 3, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
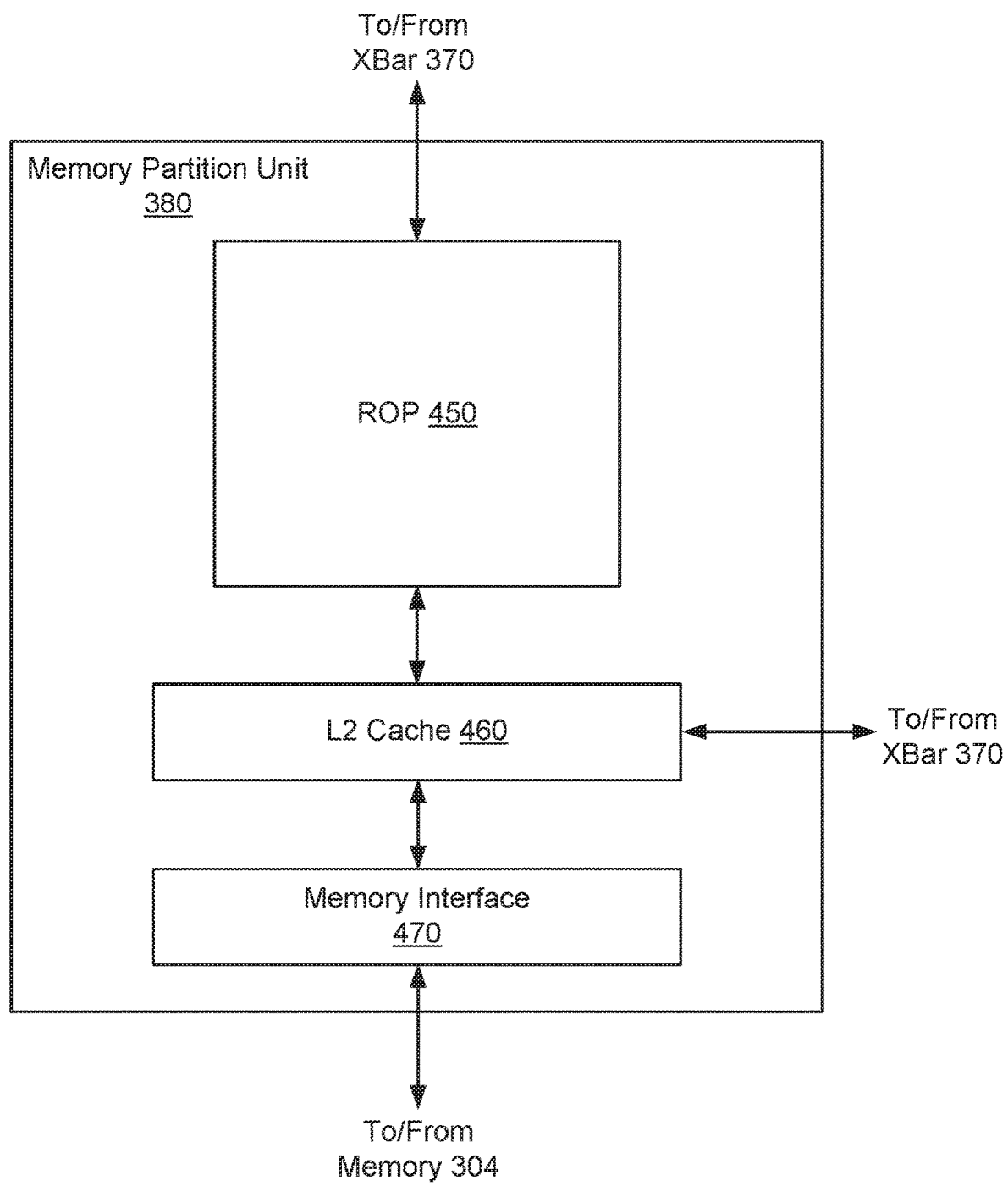
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
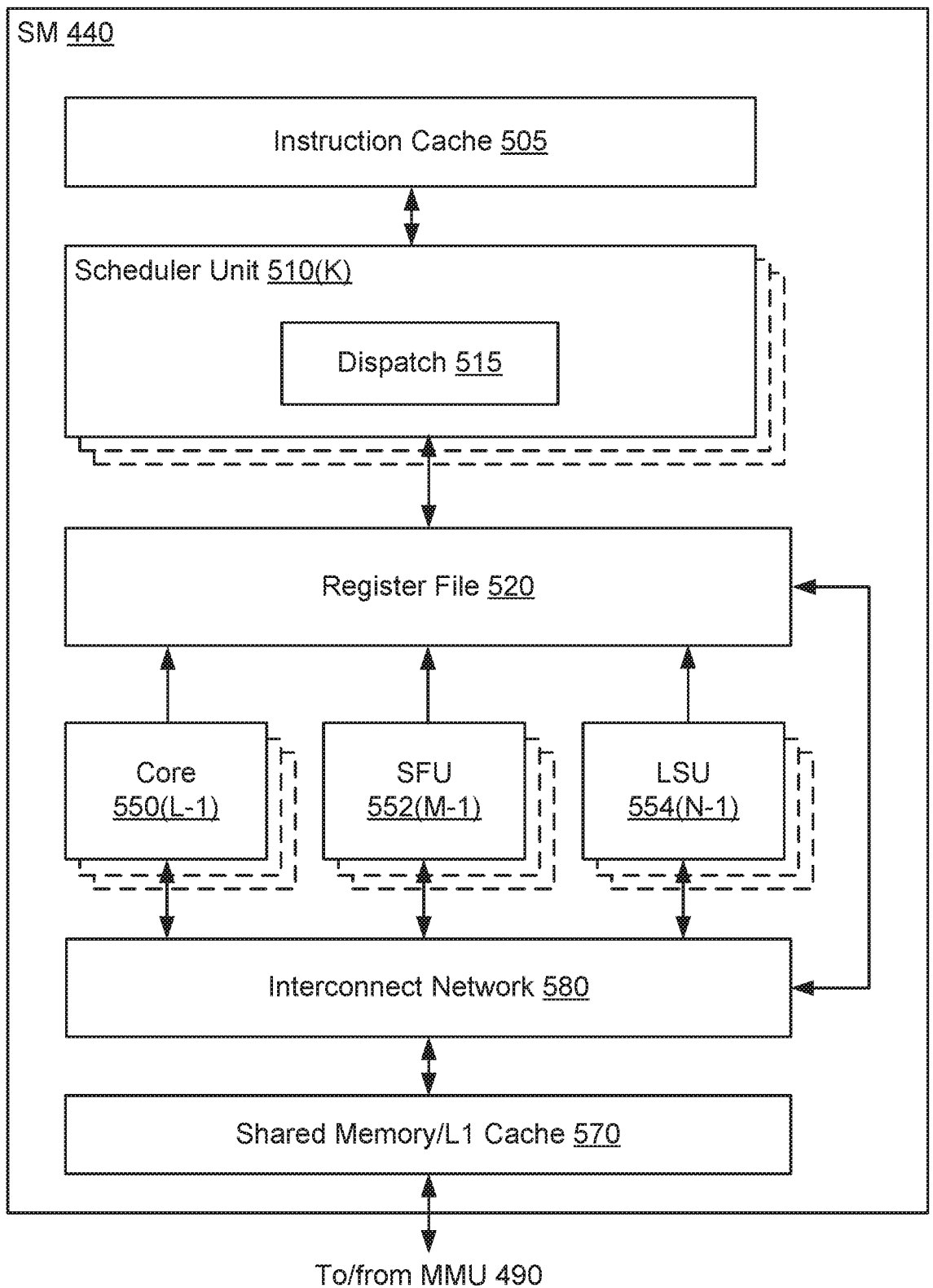
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units. In an embodiment, at least one of SFUs 552 is configured to include at least one instance of graphics processing pipeline 200 of FIG. 2A.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
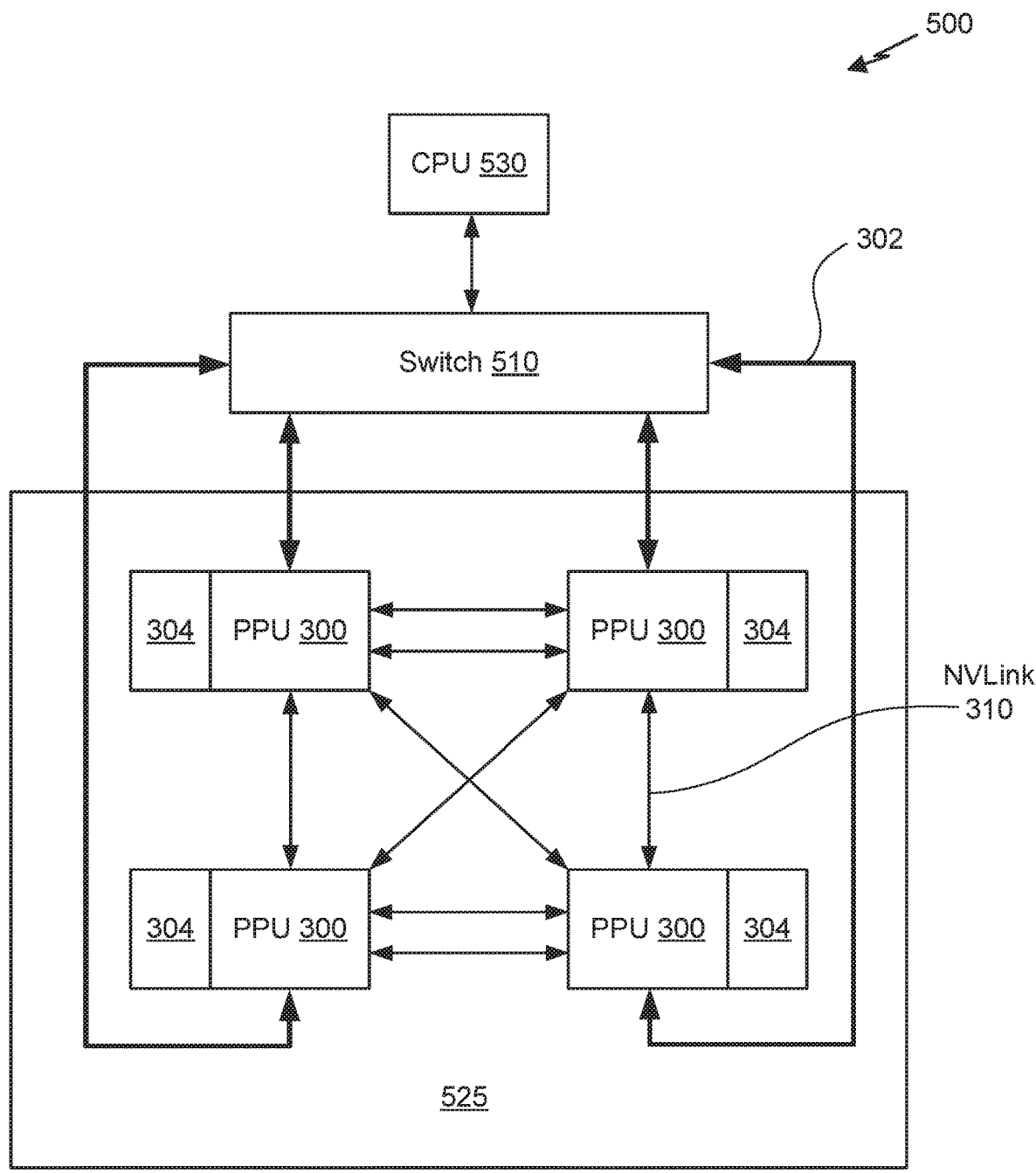
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 may be configured to implement the method 100 shown in FIG. 1A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
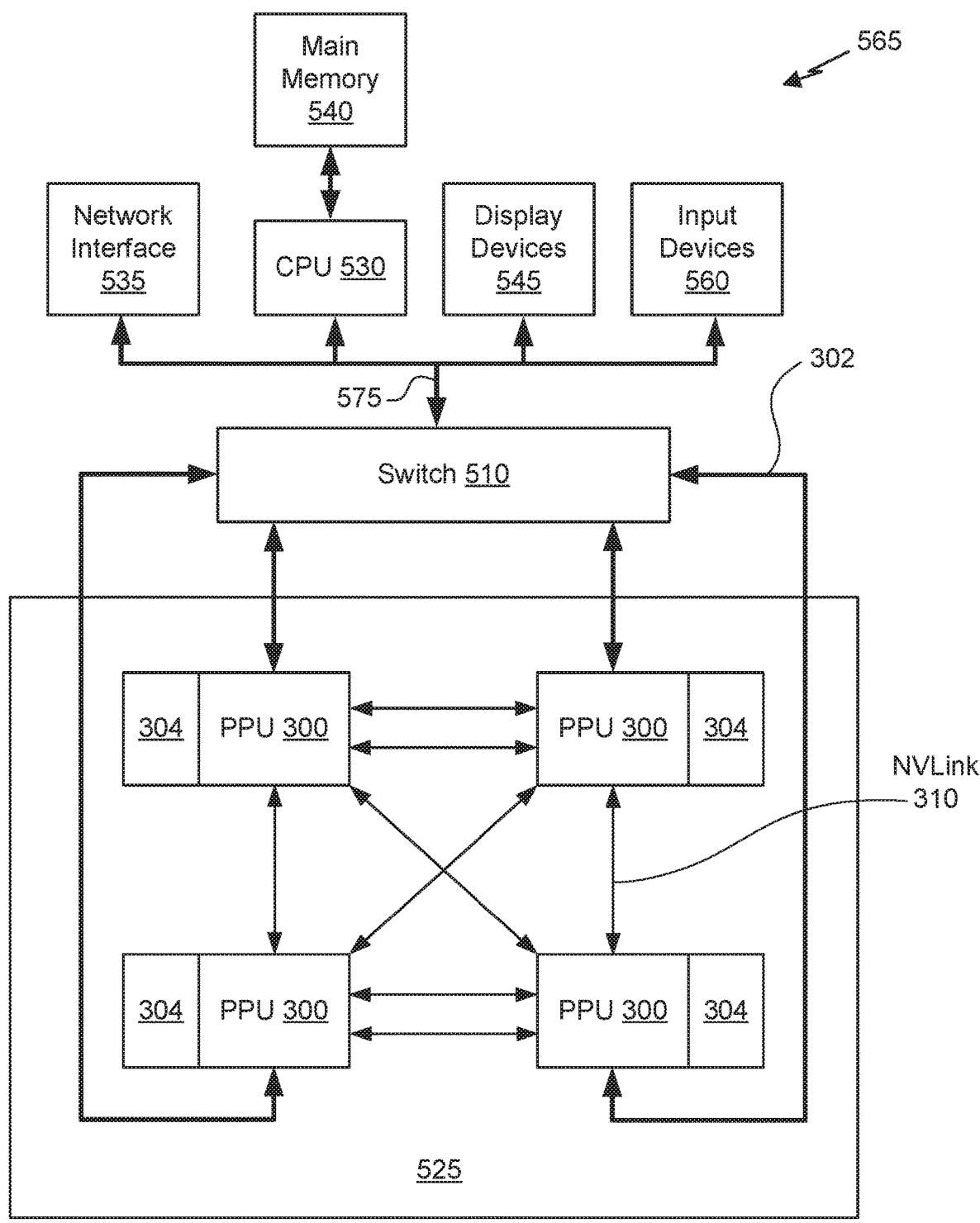
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include, without limitation, a secondary storage (not shown). The secondary storage 610 includes, for example, a hard disk drive and/or a removable storage drive, representing a magnetic or optical disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
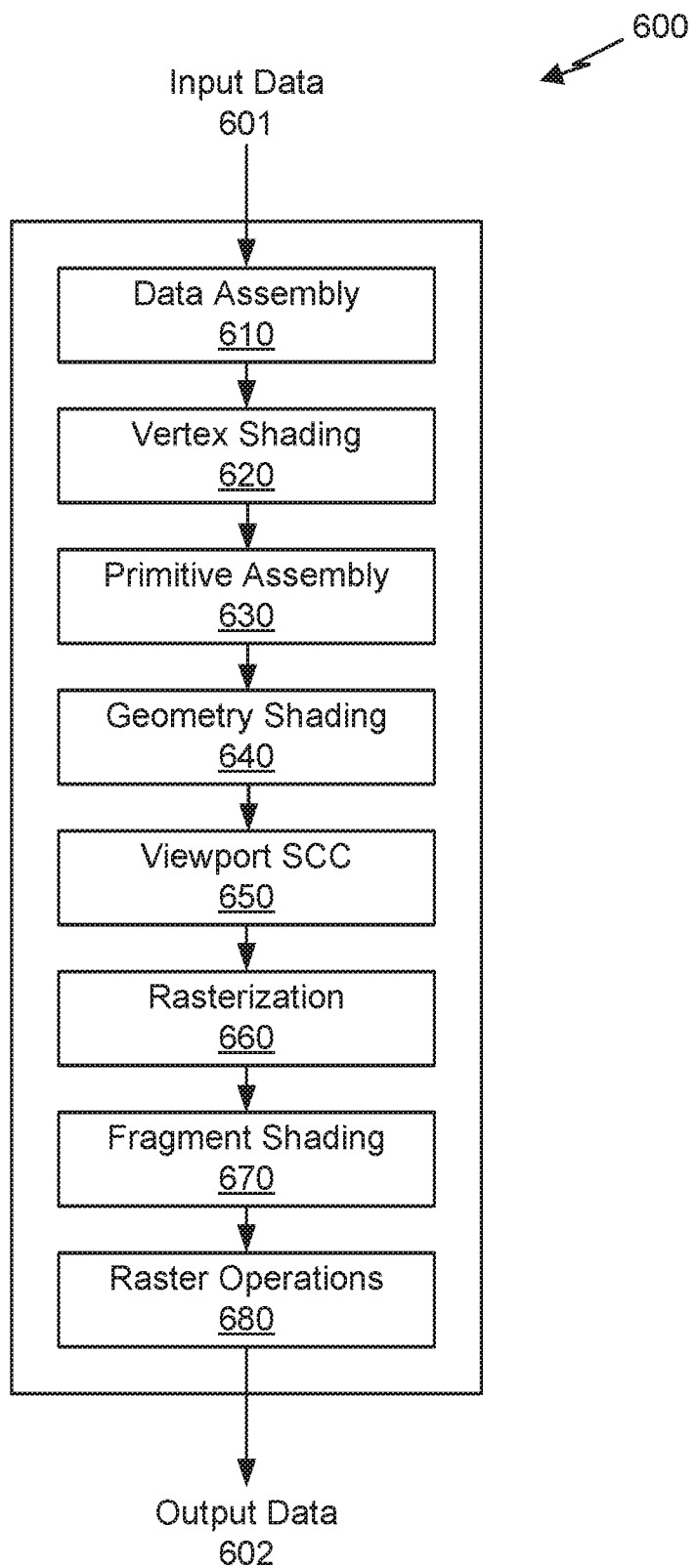
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (SCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A method, comprising:
   receiving per-primitive attribute data by a fragment shader;
   determining, for a particular attribute of a particular primitive included in the per-primitive attribute data, an attribute data format for the particular attribute based on an attribute qualifier associated with the attribute and included in the per-primitive attribute data; and
   evaluating, by the fragment shader for a sample, a plane equation using plane equation coefficients included in the per-primitive attribute data for the particular attribute in response to the attribute data format indicating that the per-primitive attribute data for the particular attribute comprises the plane equation coefficients; or
   evaluating, by the fragment shader for the sample, a barycentric-based equation using barycentric weights and per-vertex attributes included in the per-primitive attribute data for the particular attribute in response to the attribute data format indicating that the per-primitive attribute data comprises the per-vertex attribute values for the particular attribute and plane equation coefficients to calculate the barycentric weights for the sample.

2. The method of claim 1, wherein an application programming interface (API) specifies an order for vertices defining the particular primitive, and the per-primitive attribute data for each vertex of the particular primitive is received by the fragment shader in the order specified by the API.

3. The method of claim 1, wherein an application programming interface (API) specifies an order for vertices defining the particular primitive in an even position within a triangle strip, and the per-primitive attribute data for each vertex of the particular primitive is received by the fragment shader in the order specified by the API.

4. The method of claim 1, wherein an application programming interface (API) specifies an order for vertices defining the particular primitive in an odd position within a triangle strip, and the per-primitive attribute data for each vertex of the particular primitive is received by the fragment shader in a flipped order that preserves a winding direction within the triangle strip.

5. The method of claim 1, wherein the attribute data format indicates a number of bits representing elements within the per-primitive attribute data.

6. The method of claim 5, wherein the attribute data format is a single-precision or double-precision floating-point format.

7. The method of claim 5, wherein the attribute data format is a fixed-point format or an integer format.

8. The method of claim 5, wherein the attribute data format indicates a packed format specifying two or more values stored within one word.

9. The method of claim 1, further comprising:
evaluating, by the fragment shader, a barycentric value for the sample based on the plane equation coefficients for the barycentric weights; and
calculating, by the fragment shader, a distance from a point within the particular primitive to a nearest edge of the particular primitive based on a location of the point and the plane equation coefficients for the barycentric weights,
wherein the distance is equal to a square root of a sum of plane equation coefficients for the barycentric weights divided by the barycentric value.

10. The method of claim 1, wherein the particular primitive specifies a line, and one of the barycentric weights is set to zero.

11. The method according to claim 1, further comprising:
determining, for a second attribute of the particular primitive included in the per-primitive attribute data, a second attribute data format for the second attribute based on a second attribute qualifier associated with the second attribute included in the per-primitive attribute data; and
evaluating, by the fragment shader for a sample, a plane equation using plane equation coefficients included in the per-primitive attribute data for the second attribute in response to the second attribute data format indicating that the per-primitive attribute data for the second attribute comprises plane equation coefficients; or
evaluating, by the fragment shader for the sample, a barycentric-based equation using barycentric weights and per-vertex attributes included in the per-primitive attribute data for the second attribute in response to the second attribute data format indicating that the per-primitive attribute data comprises per-vertex attribute values for the second attribute and plane equation coefficients to calculate the barycentric weights for the sample,
wherein the second attribute data format for the second attribute is different from the attribute data format for the particular attribute.

12. The method according to claim 1, further comprising:
receiving screen space coordinates for the sample; and
evaluating the plane equation based on the screen space coordinates.

13. A parallel processor, comprising:
a fragment shader configured to:
receive per-primitive attribute data;
determine, for a particular attribute of a particular primitive included in the per-primitive attribute data, an attribute data format for the particular attribute based on an attribute qualifier associated with the attribute and included in the per-primitive attribute data; and
evaluate, for a sample, a plane equation using plane equation coefficients included in the per-primitive attribute data for the particular attribute in response to the attribute data format indicating that the per-primitive attribute data for the particular attribute comprises the plane equation coefficients; or
evaluate, for the sample, a barycentric-based equation using barycentric weights and per-vertex attributes included in the per-primitive attribute data for the particular attribute in response to the attribute data format indicating that the per-primitive attribute data comprises the per-vertex attribute values for the particular attribute and plane equation coefficients to calculate the barycentric weights for the sample.

14. The parallel processor of claim 13, wherein an application programming interface (API) specifies an order for vertices defining the particular primitive, and the per-primitive attribute data for each vertex of the particular primitive is received by the fragment shader in the order specified by the API.

15. The parallel processor of claim 13, wherein an application programming interface (API) specifies an order for vertices defining the particular primitive in an even position within a triangle strip, and the per-primitive attribute data for each vertex of the particular primitive is received by the fragment shader in the order specified by the API.

16. The parallel processor of claim 13, wherein an application programming interface (API) specifies an order for vertices defining the particular primitive in an odd position within a triangle strip, and the per-primitive attribute data for each vertex of the particular primitive is received by the fragment shader in a flipped order that preserves a winding direction within the triangle strip.

17. The parallel processor of claim 13, wherein the parallel processor further comprises a triangle random-access memory circuit (TRAM) coupled to the fragment shader and the per-primitive attribute data is stored in the TRAM.

18. The parallel processor of claim 17, wherein the per-primitive attribute data stored in the TRAM comprises plane equation coefficients and per-vertex attribute data.

19. The parallel processor of claim 13, wherein the fragment shader is further configured to:
evaluate a barycentric value for the sample based on the plane equation coefficients for the barycentric weights; and
calculate a distance from a point within the particular primitive to a nearest edge of the particular primitive based on a location of the point and the plane equation coefficients for the barycentric weights,
wherein the distance is equal to a square root of a sum of plane equation coefficients for the barycentric weights divided by the barycentric value.

20. A non-transitory, computer-readable storage medium storing instructions that, when executed by a multiprocessor system, cause a fragment shader executing within the multiprocessor system to:
receive per-primitive attribute data;
determine, for a particular attribute of a particular primitive included in the per-primitive attribute data, an attribute data format for the particular attribute based on an attribute qualifier associated with the attribute and included in the per-primitive attribute data; and
evaluate, for a sample, a plane equation using plane equation coefficients included in the per-primitive attribute data for the particular attribute in response to the attribute data format indicating that the per-primitive attribute data for the particular attribute comprises the plane equation coefficients; or evaluate, for the sample, a barycentric-based equation using barycentric weights and per-vertex attributes included in the per-primitive attribute data for the particular attribute in response to the attribute data format indicating that the per-primitive attribute data comprises the per-vertex attribute values for the particular attribute and plane equation coefficients to calculate the barycentric weights for the sample.

\* \* \* \* \*